United States Patent [19]

Ongena

[11] Patent Number: 4,668,460

[45] Date of Patent: May 26, 1987

[54] METHOD OF MOLDING AND COATING A SUBSTRATE IN A MOLD.

[75] Inventor: Robert E. Ongena, Romeo, Mich.

[73] Assignee: The Sherwin-Williams Company, Cleveland, Ohio

[21] Appl. No.: 849,222

[22] Filed: Apr. 7, 1986

Related U.S. Application Data

[63] Continuation-in-part of Ser. No. 718,913, Apr. 2, 1985.

[51] Int. Cl.$^4$ .................. B29D 9/00; B29F 1/10
[52] U.S. Cl. .................. 264/255; 264/40.1; 264/40.5; 264/328.8
[58] Field of Search .............. 264/40.5, 40.6, 255, 264/328.8, 1.7

[56] References Cited

U.S. PATENT DOCUMENTS

| | | | |
|---|---|---|---|
| 721,462 | 2/1903 | Richards | 264/275 |
| 2,131,319 | 9/1938 | Greenholtz et al. | 18/30 |
| 2,890,491 | 6/1959 | Hendry | 18/55 |
| 3,026,573 | 3/1962 | Ciaio | 18/59 |
| 3,028,284 | 4/1962 | Reeves | 156/213 |
| 3,077,658 | 2/1963 | Wharton | 29/155.5 |
| 3,087,201 | 4/1963 | Williams et al. | 18/59 |
| 3,096,146 | 7/1963 | Coale | 18/61 |
| 3,184,527 | 5/1965 | Fischer | 264/255 |
| 3,192,299 | 6/1965 | Hendry | 264/329 |
| 3,319,301 | 5/1967 | Ludwig | 18/42 |
| 3,507,730 | 4/1970 | Gambill et al. | 156/214 |
| 3,516,123 | 6/1970 | Lang et al. | 18/30 |
| 3,611,505 | 10/1971 | Weber et al. | 18/30 AP |
| 3,670,066 | 6/1972 | Valyi | 264/148 |
| 3,694,541 | 9/1972 | Gelin | 264/294 |
| 3,709,644 | 1/1973 | Farrell | 425/160 |
| 3,709,973 | 1/1973 | Maltby | 264/244 |
| 3,723,037 | 3/1973 | Formo | 425/139 |
| 3,801,244 | 4/1974 | Eisenberg | 425/10 Z |
| 3,819,313 | 6/1974 | Josephsen et al. | 425/244 |
| 3,847,525 | 11/1974 | Bielfeldt et al. | 425/245 R |
| 4,012,386 | 3/1977 | Davis | 264/50 |
| 4,014,966 | 3/1977 | Hanning | 264/255 X |
| 4,076,780 | 2/1978 | Ditto | 264/40.5 |
| 4,076,788 | 2/1978 | Ditto | 264/255 |
| 4,081,578 | 3/1978 | Van Essen et al. | 428/63 |
| 4,082,486 | 4/1978 | Cerano et al. | 425/129 R |
| 4,189,517 | 2/1980 | Shanoski et al. | 428/423.7 |
| 4,235,833 | 11/1980 | Arnason | 264/255 |
| 4,239,796 | 12/1980 | Shanoski et al. | 428/315 |
| 4,239,808 | 12/1980 | Arnason | 428/482 |
| 4,245,006 | 1/1981 | Shanoski et al. | 428/423.7 |
| 4,282,285 | 8/1981 | Mohiuddin | 264/DIG. 83 |
| 4,293,659 | 10/1981 | Svoboda | 528/28 |
| 4,350,739 | 9/1982 | Mohiuddin | 264/250 |
| 4,351,789 | 9/1982 | Sidles | 264/130 |
| 4,356,230 | 10/1982 | Emanuel | 428/290 |
| 4,366,109 | 12/1982 | Svoboda | 264/255 |
| 4,367,192 | 1/1983 | Arnason | 264/255 |
| 4,369,157 | 1/1983 | Conner | 264/246 |
| 4,414,173 | 11/1983 | Cobbledick | 264/257 |
| 4,422,996 | 12/1983 | Navin | 264/255 |
| 4,438,062 | 3/1984 | Griffith | 264/255 |
| 4,477,405 | 10/1984 | Makhlouf | 264/250 |

FOREIGN PATENT DOCUMENTS 2444267 4/1975 Fed. Rep. of Germany .

OTHER PUBLICATIONS

Molded Coating Process and Specifications, MD 79-012, by General Motors.

*Primary Examiner*—Jan H. Silbaugh
*Assistant Examiner*—Harold Pyon
*Attorney, Agent, or Firm*—Robert E. McDonald; James V. Tura; David B. Deioma

[57] ABSTRACT

A method of molding and coating in a mold a thermosetting substrate including the steps of forming the substrate between at least two separable dies which form a mold cavity therebetween, curing the substrate to the point that the substrate is receptive to a coating, injecting the coating into the mold cavity at a pressure substantially in excess of the mold cavity pressure while maintaining the dies in position whereby the coating is forced over the desired surface of the substrate and curing the coated substrate.

28 Claims, 6 Drawing Figures

METHOD OF MOLDING AND COATING A SUBSTRATE IN A MOLD.

CROSS REFERENCE TO RELATED APPLICATION

This Application is a continuation-in-part of co-pending application Ser. No. 718,913 filed Apr. 2, 1985 now abandoned.

BACKGROUND OF THE INVENTION

DESCRIPTION OF PRIOR ART

Molding of thermosetting plastics has become widespread. Particularly in the automotive industry where weight is a significant factor, molding of plastic parts for interior parts and exterior panels has become common. As set forth in a brochure MD 79-012 of General Motors entitled "Molded Coating Process and Specifications," exterior class "A" panels are formed of a composite of specialty polyester resins, thickeners, thermoplastic copolymers, mineral fillers, fiber reinforcements, catalysts, and release agents. These materials are commonly combined (with different variations) in a sheet form and are known as "SMC." In the known molding technique of Compression Molding, a piece of SMC of the appropriate size is placed in a mold made up of a fixed and movable die which define a mold cavity therebetween. The dies are nested in the sense that they have side or shear edges which closely interfit and act as a seal during molding.

The dies are forced closed by a press ram under high forces that cause pressures on the substrate up to about 1500 psi. As a practical matter, the initial pressure must be high enough to form the substrate into the shape of the mold cavity. Depending on the size and shape of the part to be formed, different pressures are required. This molding process is commonly carried out at 300° F. but different temperatures, for example, 100° to about 400° F., may be used.

The molded products resulting from Compression Molding can have surface defects, such as surface pits, porosity, sink marks and shrink cracks. In order to cover these defects to produce a class "A" surface, a technique of in-mold coating has been developed. The process for molding and in-mold coating presently includes the following sequence:

(1) the mold is opened and an SMC charge is placed between the dies in the mold cavity;
(2) a press ram closes the mold under enough pressure to form or mold the substrate;
(3) level control cylinders try to maintain the dies in parallel condition while closing;
(4) after at least partial curing, the press ram releases the pressure;
(5) cylinders force the mold open;
(6) an injector shut-off pin for the coating opens;
(7) the metering pump(s) stroke, injecting the coating;
(8) the shut-off pin closes;
(9) the press ram re-pressurizes;
(10) the level control cylinder readjusts to try to maintain parallelism while reclosing to allow the coating to spread evenly across the part surface;
(11) the coating is cured; and
(12) the press ram is released, the dies are separated, and the part is removed.

The opening and closing of the mold, the depressurizing and repressurizing, and their accompanying level adjustment are major time delays in the in-mold coating process. A typical example of this process is illustrated in FIGS. 4 and 5 of U.S. Pat. No. 4,076,778 to Edwin D. Ditto, which is incorporated herein by reference. It is estimated that this opening and closing of the molds take up 5 to 20 percent of the total molding and coating process time. When the millions and millions of parts that are molded yearly are considered, the inefficiency and cost of this opening-closing routine are staggering.

The reopening and reclosing of the mold cause other problems as well. Opening of the dies causes the flashing around the shear edges to enter the mold cavity. Disturbance of the shear edge may cause an incomplete seal after reclosing. Moreover, the open-close coating method precludes the possibility of using secondary cores or slides in the mold. The slide usually comes in at an angle to one of the dies, and thus cannot be used if the die moves relative to the substrate. Another major limitation of in-mold coating as presently practiced is that it is not readily applicable to injection or reaction injection molding processes. These types of molding processes do not use dies that normally have shear edge construction.

It would be highly desirable to eliminate the secondary opening and closing of the dies from an efficiency and flexibility point of view.

SUMMARY OF THE INVENTION

This invention includes the process of molding parts and coating them in the mold. It includes forming a substrate in any mold having at least two separable parts and at least partially curing it to the degree that it has a surface receptive to a coating. The coating is injected into the mold at a high pressure without reopening or reclosing the mold. The coated part is subsequently cured and removed.

The elimination of the steps of opening and closing the dies by injecting coating at high pressures greatly increases the efficiency of the process, makes it more reliable, allows the use of secondary cores and slides, and probably makes it applicable to many forms of molding.

The prior art method of coating in the mold as described in Ditto required that the substrate be molded until it had hardened sufficiently to retain its shape during opening of the mold and injection of the coating. In the process of this invention where the mold is not reopened to allow for injection of the coating and then reclosed, the substrate need only be cured sufficiently to provide a surface which is receptive to the coating. This frequently allows injection of the coating at an earlier time in the molding cycle and thereby shortens the time required for the entire molding cycle.

The time for compression molding a part varies widely with its size and shape. Larger, more complex parts naturally take more time. However, for any given part, it is estimated that the elimination of the opening and closing of the dies and the associated steps will save from 5 to 20 percent of the total molding and coating time. This saving translates to obtaining about the same percentage increase in productivity from existing capital equipment. For capital equipment for which costs often run into the millions of dollars for a single facility, the extra productivity is highly significant.

The reliability of in-mold coating to produce consistent, uniform products is also enhanced by this process. All the defects to the part and coating resulting from the reopening and reclosing of the dies are eliminated.

Shear edge flash contamination, distortion, loss of the proper seal, and loss of parallelism are all undesirable frequent occurrences when the mold is opened and closed during the injection of the coating. Additionally, the opening and closing of the mold in the prior art processes may allow the addition of air into the mold which can cause defects in the coating or in the substrate and which may require ventilation from the mold to remove the newly entrapped air from the mold cavity. The process of this invention eliminates these difficulties as well.

This improved method of molding and coating products has broader application than the previous methods. Since the mold is not reopened, cores or slides in the die may be used to create different shapes or openings in the part. These items previously had to be done with a secondary operation. Since the present coating process does not include opening the mold during the curing process, it would appear to be useful in injection molding. The same could be said of reaction injection molding and other types.

The high pressure injection also appears to coat more uniformly than low pressure injection. Moreover, the use of mechanisms to ensure parallelism of the dies does not appear to be necessary for this coating process, although it may still be necessary to ensure even flow of the substrate in the die cavity. Furthermore, the precision mold opening devices commonly used in the prior art, such as precision push-back systems for separating the dies prior to injection of the coating, are normally not necessary in the process of this invention.

DETAILED DESCRIPTION OF THE DRAWINGS

Figure 1:
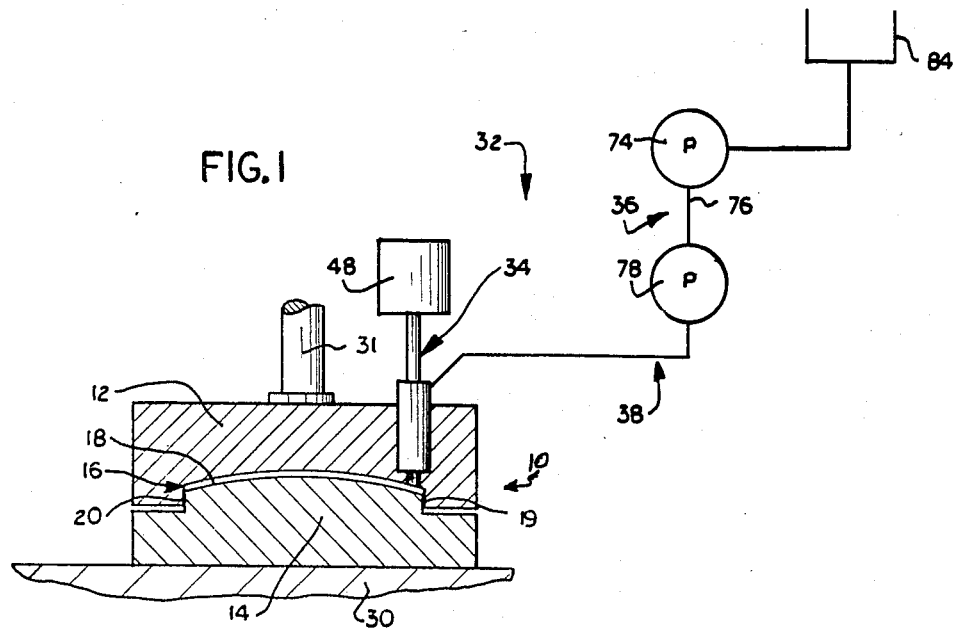
FIG. 1 is a schematic representation of the compression mold and injection means.
Figure 2:
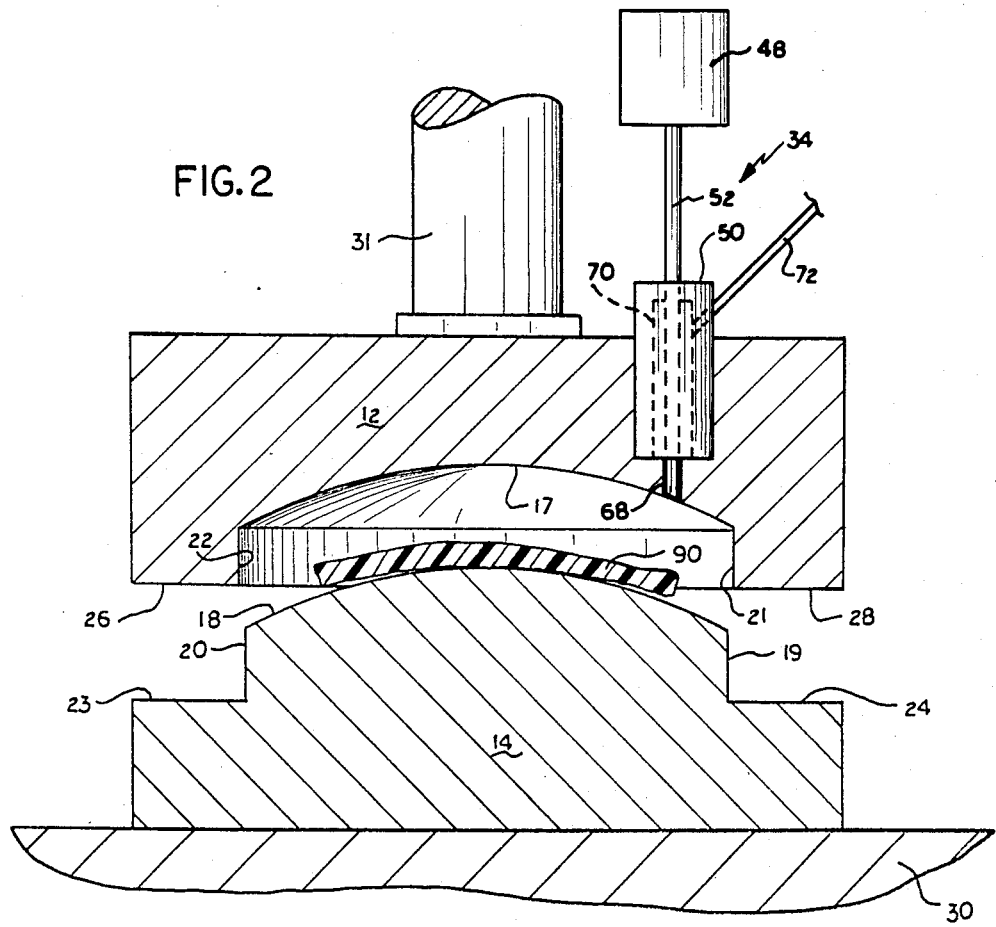
FIGS. 2-6 illustrate a process of compression molding utilizing in-mold coating.

The general system of the process of this invention is illustrated in FIG. 1. It includes a mold 10 made up of dies 12,14 which are generally nested in the sense that they form a mold cavity 16 therebetween and have complementary surfaces 17 and 18. The concave surface 17 forms the bottom of the die of cavity 12. The convex surface 18 forms the upper surface of the lower die 14, also frequently called the "core."

As illustrated in more detail in FIGS. 2 through 6, the shear edges 19 and 20 on the die 14 and 21 and 22 on the die 12 are dimensioned to closely interfit with a very small dimensional difference. It is important that the shear edges in compression molding are very accurately dimensioned, since the substrate used in the molds goes into the shear edges and, when it begins to cure, acts as a seal.

Horizontal surfaces 23,24 on the lower die 14 interfit with complementary surfaces 26 and 28 on the upper die 12. At times, spacers or stops are used between the dies to ensure parallelism. The lower die 14 sits on a press bed 30 and the upper die 12 is motivated downwardly by a press ram 31. Cylinders or other means for separating the dies are also built into such machines, but are not shown.

An injection means, generally shown as 32, includes an injector 34, pump means 36, and appropriate conduit system 38. The injector 34 as particularly shown in FIGS. 2 through 6 includes an actuator 48 of any known type, such as hydraulic or electric. An injector housing 50 surrounds a pin 52 which passes therethrough and is operatively connected to the actuator 48. An example of such an injector is Model No. MRF 600-625-250, manufactured by The Morrell Co., Inc. A chamber 70 in the housing 50 connects a bore 68 in the die 12 with a conduit 72 leading to the pump means 36. Conduit 72 is part of the conduit system 38.

The chamber 70 is generally complementary with the shape of the pin 52, and has appropriate seals between it and the pin 52 to ensure fluidtight operation. Conduit 38 would normally include the fittings, hoses, tubes, pipes, etc. which are necessary in this type of process. In this particular embodiment, the connectors, fittings, and conduits should have an operating pressure substantially in excess of the pressures generated by the pump of the coating. In this particular embodiment, it may mean operating pressures of 5000 or 6000 psi, or even higher.

The pump means 36 includes a first high pressure pump 74. Any type of high pressure pump for coating means will be applicable, and a typical commercially available one would be the Model No. 206-445, manufactured by Graco Co. The output of the pump 74 goes through a conduit 76 and to a second high pressure pump, or metering pump, which steps up the pressure of the coating. The coating may be a one-component system as illustrated in FIG. 1, or a two or more component system. This invention is not limited to any particular type of coating or coating system. The second high pressure metering pump may be of any commercially available type, such as Model No. 851002000, manufactured by The Morrell Company, Inc.

One example of coatings that has been found successful is a molding coating manufactured by The Sherwin-Williams Company and known as Glas-Clad E67 BC 10. The general type of coating utilized in the present process is illustrated in U.S. Pat. No. 4,293,659 to Svoboda, the disclosure of which is incorporated herein by reference.

The coatings which are useful in the in-mold coating process of this invention include any coating which could be polymerized and/or cross-linked within the mold. These coatings typically are cured or polymerized by free radical and/or condensation polymerization methods and can include both single-component and two-component coatings, as are well-known in the art. Representative coatings include acrylic and acrylic ester polymers, saturated and unsaturated polyesters, epoxy esters, active hydrogen containing resins cross-linkable by blocked or free isocyanates and others. If a two-component resin system is used, the components are mixed, typically by a static mixer such as that made by Kenics Corporation, immediately prior to injection into the mold.

The cure time required for the coatings should be slow enough to allow the coatings to flow over the molded part in the mold prior to excessive gellation, but short enough to allow substantial curing within the molding cycle. Typically, cure times will run from about 15 to about 100 seconds at mold temperatures of about 300° F.

In addition to the polymerizable components, the in-mold coatings may also contain pigments, conductive materials such as carbon black, mold release agents such as dialkyl phosphates, initiators, catalysts, accelerators, flow agents, thickeners and other additives.

Representative one-component in-mold coatings typical of those useful in this invention include those taught in U.S. Pat. Nos. 4,235,833 and 4,239,808 (free radical polymerizable vinyl ester resin/polyvinyl acetate/styrene); U.S. Pat. Nos. 4,293,659 and 4,366,109 (polymerizable blocked isocyanate/ethylenically unsaturated polymer/ethylenically unsaturated monomer); U.S. Pat. No. 4,414,173 (polymerizable epoxy-based oligomer/-copolymerizable monomer; copolymerizable monoethylenically unsaturated compound/ polyvinyl acetate); U.S. Pat. No. 4,422,996 (unsaturated monomer solution of a polyurethane polyacrylate and a copolymerizable ethylenically unsaturated monomer solution of an acrylic or methacrylic ester of a diepoxide); and U.S. Pat. No. 4,477,405 (an ethylenically unsaturated monomer dispersion of a polymerizable ethylenically unsaturated urea-urethane polymer).

Representative two-component coating systems include the coatings taught in U.S. Pat. No. 4,081,578 (polyisocyanate/active hydrogen containing resin); and U.S. Pat. No. 4,189,517 (diisocyanate/unsaturated polyester/saturated polyester diol flexibilizer/cross-linking polyol). The teaching of coating materials useful in in-mold coating in all of these patents is hereby incorporated by reference.

The coating is added to the mold in amounts sufficient to provide coverage of the plastic part to the desired film thickness. Typically, the coating will provide a final cure film thickness of at least 0.1 mils and could range up to a thickness of about 20 mils. Typically, the film thicknesses range from about 1.0 to about 10 mils of cured coating.

One process of this invention of molding and in-mold coating is illustrated in FIGS. 2 through 6. Initially the SMC charge 90 is placed on the lower die 14 when the dies are separated or the mold is open. In such position, the pin 52 blocks the bore 68 so that the coating cannot flow into the mold cavity 16. Although this process is described in terms of the sheet molding material, it should be understood that any type of material or form of material, such as bulk molding compound, or other plastics, may be utilized.

Any thermosetting or thermoplastic plastic substrate could be used in the practice of this invention. Representative examples of thermosetting plastics include the compression and injection molded plastics, such as unsaturated polyesters as in SMC, epoxies, phenolics, silicones, polyurethanes, etc. Representative examples of useful thermoplastic materials include polyethylene, ABS, PVC, polystyrene, polypropylene, acrylics, etc.

Figure 3:
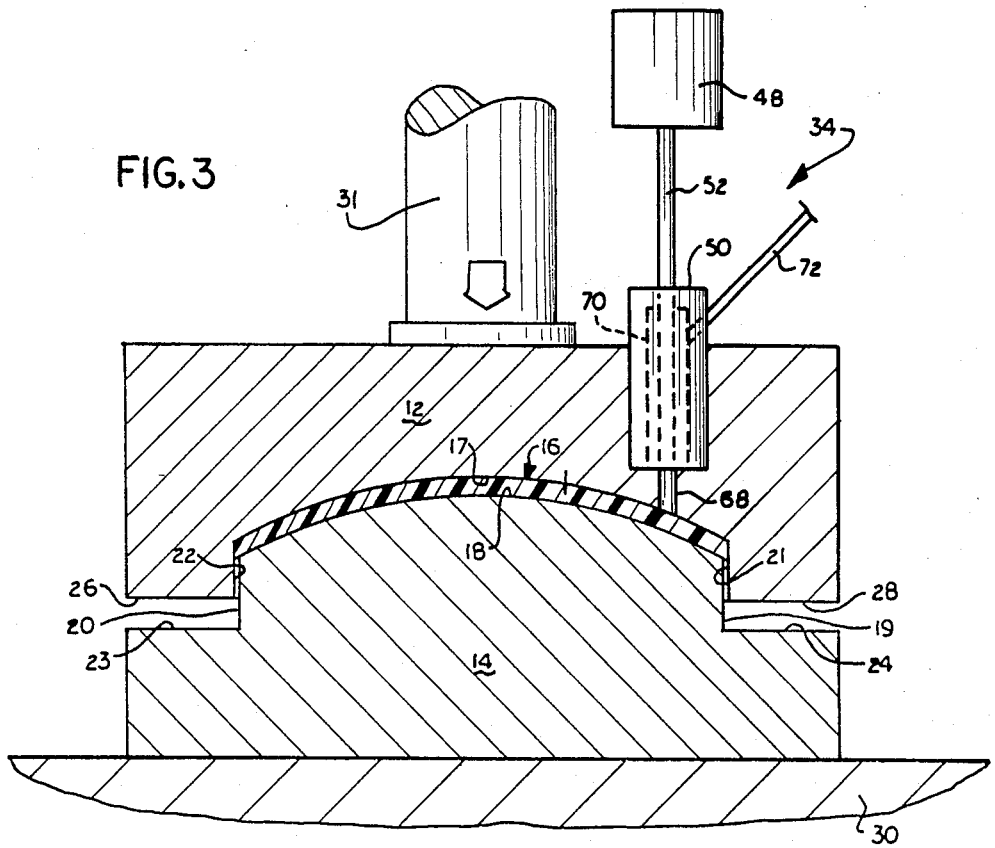

Subsequently, as shown in FIG. 3, the press ram 31 compresses the SMC 90 at a first mold cavity pressure and temperature which causes it to conform to the shape of the die cavity 16. As used herein, mold cavity pressure means the force exerted by the ram press divided by the top surface area of the formed substrate 96. In compression molding, this pressure would typically be in the area of 500 psi to 2000 psi. At this point, the pin 52 blocks the coating from the injection system 36.

Figure 4:
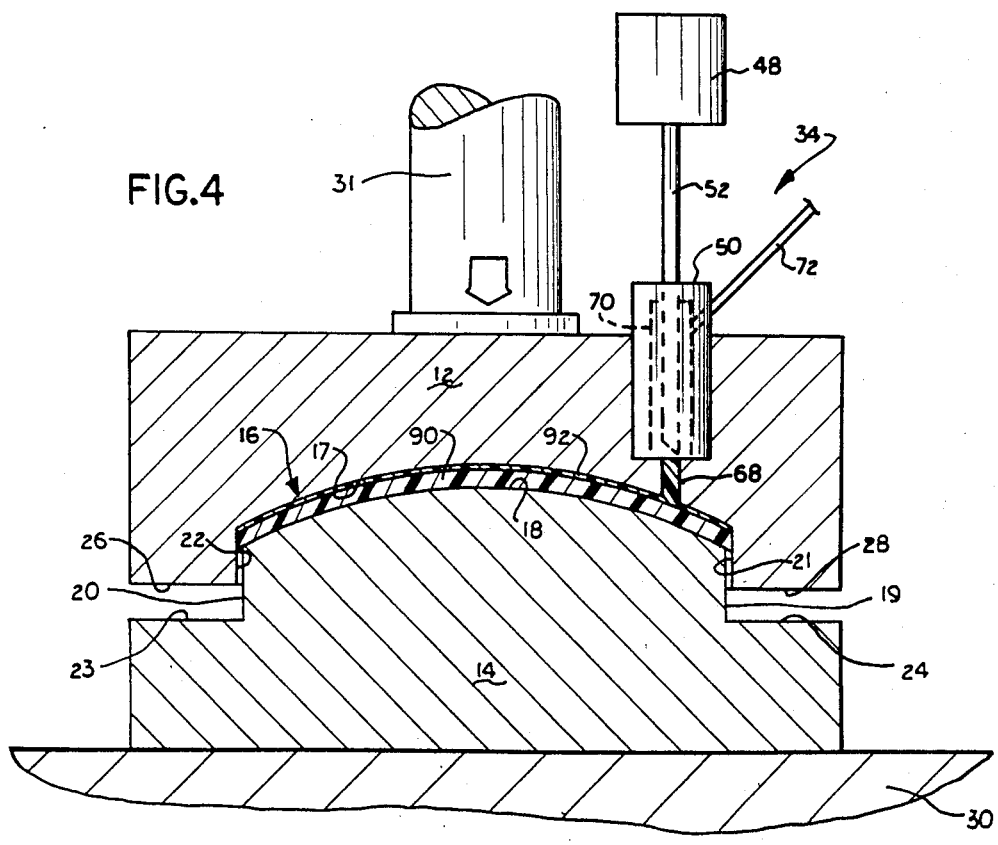

A sequentially timed actuator 48 or other type of actuator retracts the pin 52 in FIG. 4, allowing the coating at a substantially higher pressure than the mold cavity pressure to flow through the conduit 72, chamber 70, and bore 68, into the mold cavity 16. Substantially higher pressure means a pressure sufficient to overcome the positive mold cavity pressure to the point where the coating spreads over the surface of the substrate. In most instances, the pressure of the injected coating will be at least two times, and more often at least four times, the mold cavity pressure immediately prior to injection. Because of the very high pressure of the coating material, it coats the substrate 90 evenly without retraction of the die 12. It is only necessary in the timing cycle that the substrate 90 be cured to the point where it has formed a skin and is thus receptive to a coating.

In a compression molding process, the substrate polymers cross-link and shrink. As the substrate shrinks, the dies move toward each other to fill up the space. When the coating is subsequently injected at high pressures into the mold cavity 16, it acts to further compress the substrate 90. It is possible that the addition of the coating at high pressure may also raise the die 12 very slightly in spite of maintaining a ram pressure. Any movement of the dies, however, is ancillary to the injection of the coating and is not intentionally done and does not precede the step of the injection. It is also important to note that the pressure is maintained in the mold cavity 16 and that the mold remains closed, that is the dies 11 and 12 remain in position and continue to define substantially the same mold cavity 16 prior to and during the injection of the coating. By maintaining the dies in a fully closed position and maintaining the mold cavity, and therefore the substrate, under positive mold cavity pressure, e.g. greater than atmospheric pressure and typically at least 100 psi and frequently at least 500 psi, the coating, when injected at a substantially greater pressure than the positive mold cavity pressure, is forced over the surface of the substrate thereby compressing the substrate slightly and causing the coating to cover the surface without the requirement of depressurizing and/or reopening the mold prior to or contemporaneously with the injection of the coating followed by repressurizing and reclosing of the dies.

The actual mold cavity pressure prior to the injection may be the original molding pressure utilized to force the substrate into the proper form. Alternately, the pressure in the mold cavity immediately preceding the coating injection may be lower than the molding pressure. It is common in the molding industry to sometimes utilize a two-pressure molding technique. In this technique, the original high pressure, eg. 500 to 2000 psi, is utilized to form the substrate and a subsequent lower pressure typically of about one-fourth to three-fourths of the forming pressure, e.g. 100 to 600 psi is used during the partial curing of the substrate. However, low pressure systems sometimes use molding pressures as low as 100-150 psi. Representative low pressure systems would include reaction injection molding processes.

Because the size and shape of the dies will dictate the pressure of the mold cavity and the pressure of the coating, no one particular set of values can be stated. However, in an example that has been utilized, an operating pressure of about 1260 psi in the mold cavity was utilized with a coating pressure of about 4000 psi. In this example, it was not necessary to reduce the mold cavity pressure and the coating coated all of the desired surfaces of the substrate evenly at a uniform thickness of about 4 mils.

The amount of coating injected into the mold can be controlled in any one of several known manners. For example, as shown in the above-noted Ditto patent, a predetermined amount of coating can be captured in a chamber and then released. Alternately, a timing mechanism can be used to meter the coating at a predetermined rate, and therefore a known volume, into the mold cavity.

Figure 5:
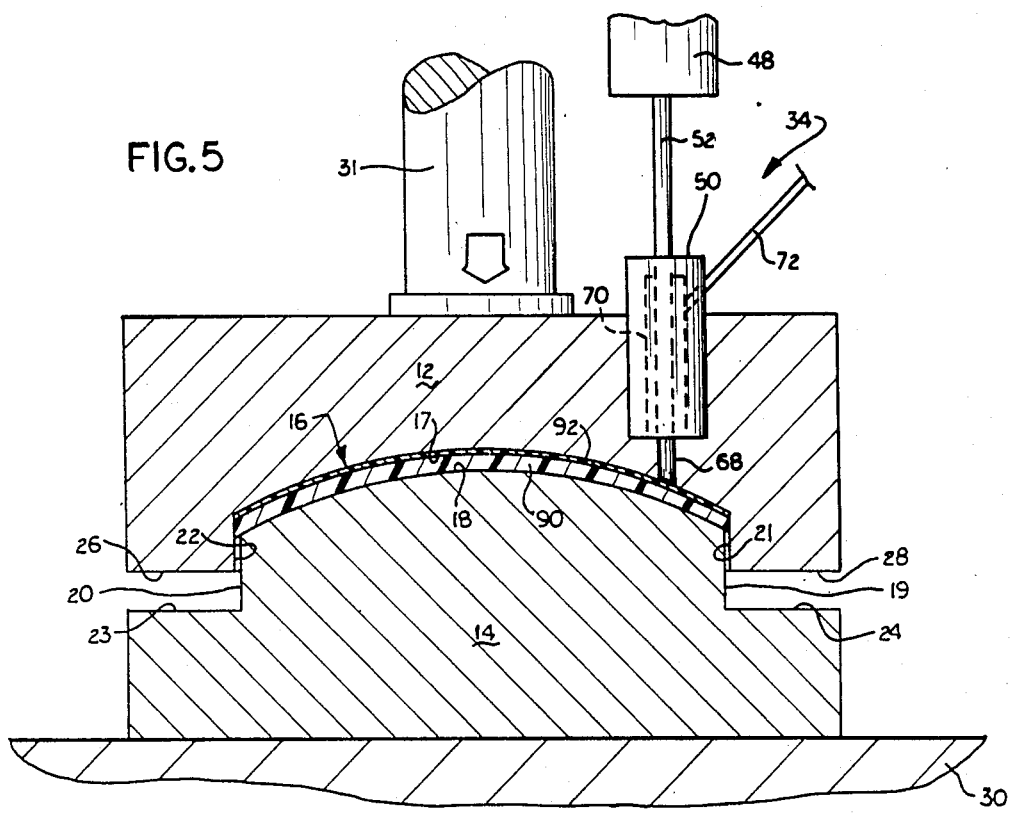
Figure 6:
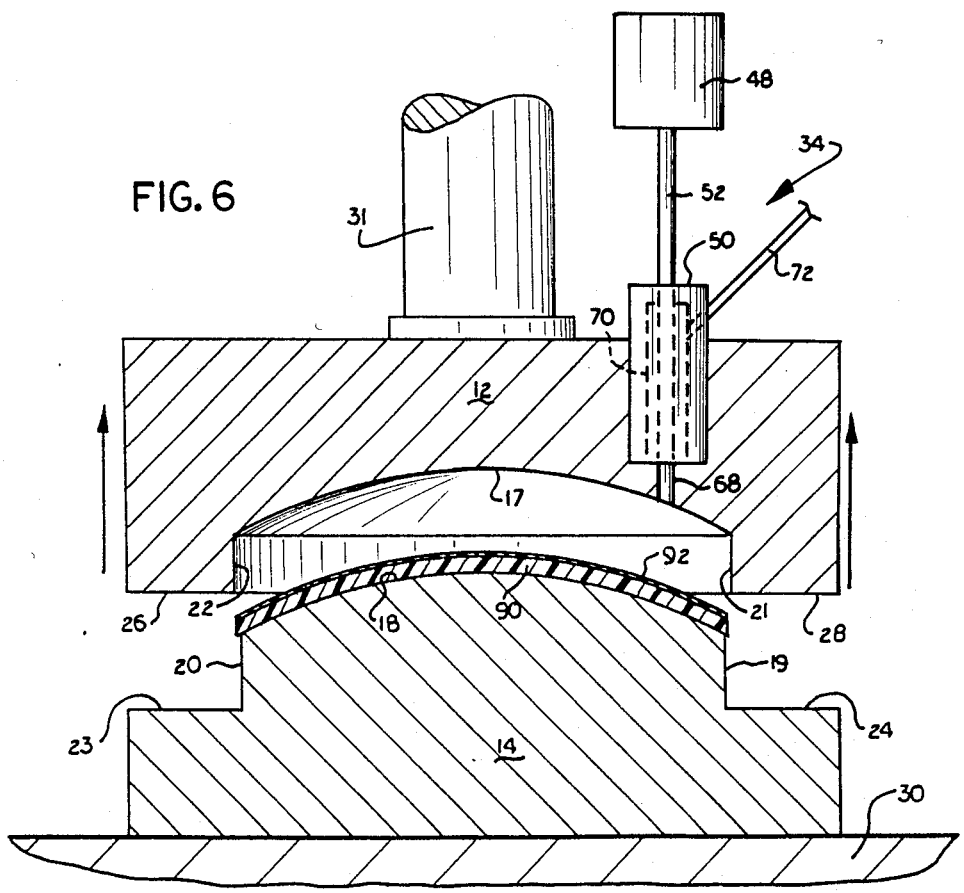

When the injection of the coating is complete, the pin 52 is moved downwardly, as shown in FIG. 5, by the actuator 48 to again block the opening to the bore 68. The coated, formed substrate is then maintained in the mold cavity for a period of time, depending on the size and shape of the article, until both the coating and the substrate are cured. When the molding process is complete, the dies are separated, usually by pistons (not shown), and the finished product is removed.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A method of molding and coating in the mold a substrate comprising:
    molding the substrate between at least two separable dies which form a mold cavity therebetween at a mold cavity pressure and temperature compatible with forming the substrate until the substrate reaches a condition where its surface has cured to the point that it is receptive to a coating;
    injecting a coating into the mold cavity at a pressure substantially in excess of what the positive mold cavity pressure was immediately prior to injection while maintaining the dies in a pressurized, closed position whereby the coating is forced over the surface of and compresses the substrate; and
    curing the coated, formed substrate.

2. The process of claim 1, wherein the injection pressure of the coating is at least two times the pressure in the mold cavity immediately before injection.

3. The process of claim 1, wherein the injection pressure of the coating is at least four times the pressure in the mold cavity immediately before injection.

4. The process of claim 3, wherein the temperature of the molding process is between 100° F. and 400° F.

5. The process of claim 4, wherein the substrate is a thermosetting sheet molding compound.

6. The process of claim 1 wherein the mold cavity pressure immediately prior to injection of the coating is at least 100 psi.

7. The process of claim 1 wherein the mold cavity pressure immediately prior to injection of the coating is at least 500 psi.

8. A method of molding and coating a thermosetting substrate in a mold having a mold cavity formed by separable dies, one of said dies having a port therein and a coating injection means operably connected to the port:
    (a) opening the dies;
    (b) placing the thermosetting substrate between the dies;
    (c) closing the dies and compressing the substrate at a first pressure and temperature in the mold cavity, thereby causing the substrate to take substantially the shape of the mold cavity;
    (d) at least partially curing the substrate;
    (e) injecting the coating into the mold cavity through the port at a pressure substantially higher than what the positive mold cavity pressure was immediately prior to injection while the dies remain closed and pressurized so that the coating covers a surface of the substrate, and
    (f) curing the coated, formed substrate.

9. The process of claim 8, wherein the substrate is cured to the point where shrinkage occurs and the substrate is compressible by the coating injected under high pressure.

10. The process of claim 8, wherein the substrate is cured until the surface which is to be coated forms a skin which is compatible with the coating.

11. The process of claim 10, wherein the formed substrate is partially cured at a second pressure which is less than the first pressure.

12. The process of claim 11, which further includes opening the dies and removing the formed, coated substrate.

13. The process of claim 12, wherein the first pressure is between 500 and 2000 psi and the first temperature is between 100° F. and 400° F.

14. The process of claim 13, wherein the second pressure is between 100 and 600 psi.

15. The process of claim 10, wherein the injection pressure of the coating is at least two times the mold cavity pressure.

16. The process of claim 10, wherein the injection pressure of the coating is at least four times the mold cavity pressure.

17. The process of claim 10, wherein injecting the coating into the mold cavity through the port includes positioning an injector pin in a first position to block the port until the substrate is at least partially cured;
    moving the pin to a second position so that the coating travels through the port and into the mold cavity;
    moving the pin back to the first position after a predetermined amount of coating sufficient to coat the desired surface of the substrate has been injected.

18. The process of claim 17 wherein the amount of coating injected into the mold cavity is determined by passing it through a metering pump.

19. The process of claim 18, wherein injecting the coating into the mold cavity includes raising the pressure of the coating to a third pressure by means of a first pump, taking the output of the first pump and raising the coating to a fourth pressure by means of a second pump which acts to meter the coating.

20. The process of claim 10, wherein the first pressure is maintained in the mold cavity until the injection of the coating has begun.

21. The process of claim 11, wherein the second pressure is maintained before the injection of the coating begins.

22. A method of molding and coating a substrate in a mold having a mold cavity formed by separable dies, the substrate being a material that will cure in the mold cavity, one of the dies having a port therein and a coating injection means operably connected to the port, comprising:
    (a) putting the substrate into the mold cavity under environment conditions which causes the substrate to take substantially the shape of the mold cavity;
    (b) at least partially curing the substrate to a condition where it forms a skin which is compatible with having a coating placed upon it;

(c) injecting a coating into the mold cavity at a pressure substantially higher than the positive mold cavity pressure immediately prior to injection, the coating being injected into the mold cavity through a port in one of the dies while the dies remain closed and pressurized so that the coating covers the surface of the substrate; and (d) continuing to cure the coated, formed substrate.

23. The process of claim 22, wherein the substrate is cured to the point where shrinkage occurs and the substrate is compressible by the coating injected under high pressure.

24. A method of molding and coating a substrate in a mold having a mold cavity formed by separable dies, the substrate being a material that will cure in the mold cavity, one of the dies having a port therein and a coating injection means operably connected to the port, comprising:

(a) putting the substrate into the mold cavity under environmental conditions which cause the substrate to take substantially the shape of the mold cavity;

(b) at least partially curing the substrate to a condition where it forms a skin which is compatible with having a coating placed upon it and where the substrate is still compressible by injection of the coating into the closed mold cavity;

(c) maintaining the dies in a closed position under pressure whereby they continue to define substantially the same mold cavity while injecting a coating into the mold cavity at a pressure substantially higher than the positive mold cavity pressure immediately prior to injection, the coating being injected into the mold cavity through a port in one of the dies while the dies remain closed and pressurized so that the coating covers the surface of the substrate; and (d) continuing to cure the coated, formed substrate.

25. The method of claim 24 wherein the substrate is a thermosetting sheet molding compound.

26. The method of claim 24 wherein the substrate is a reaction injection molded substrate.

27. The method of claim 24 wherein the substrate is a thermosetting bulk molding compound.

28. The process of claim 1 wherein the substrate is an injection molded plastic.

* * * * *